A. H. GROSZ.
VEHICLE BRAKE.
APPLICATION FILED DEC. 8, 1915.

1,187,308.

Patented June 13, 1916.
2 SHEETS—SHEET 1.

Inventor
A. H. GROSZ
By Watson E. Coleman
Attorney

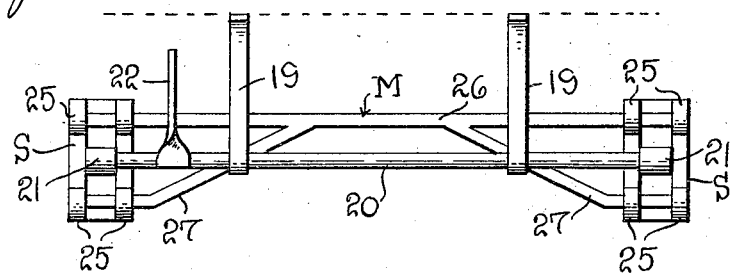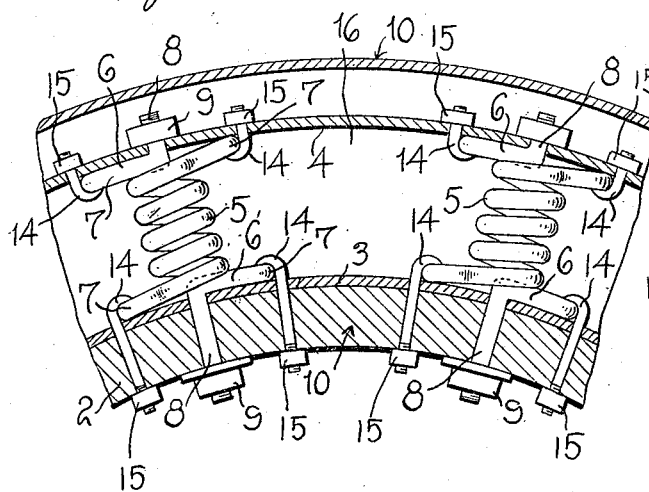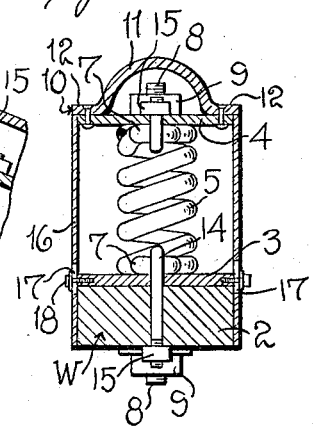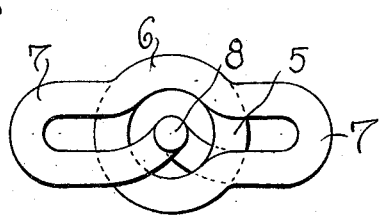

UNITED STATES PATENT OFFICE.

ADAM H. GROSZ, OF NEW ORLEANS, LOUISIANA, ASSIGNOR OF ONE-HALF TO BENNETT W. SEIDEL, OF NEW ORLEANS, LOUISIANA.

VEHICLE-BRAKE.

1,187,308.  Specification of Letters Patent.  Patented June 13, 1916.

Application filed December 8, 1915. Serial No. 65,741.

*To all whom it may concern:*

Be it known that I, ADAM H. GROSZ, a citizen of the United States, residing at New Orleans, in the parish of Orleans and State of Louisiana, have invented certain new and useful Improvements in Vehicle-Brakes, of which the following is a specification, reference being had to the accompanying drawings.

This invention relates to certain improvements in vehicle brakes and has relation more particularly to a brake mechanism especially designed and adapted for use in connection with a motor driven vehicle and it is an object of the invention to provide a novel and improved brake adapted to coact with the periphery of a wheel whereby a maximum of efficiency is obtained.

It is also an object of the invention to provide a novel and improved brake structure wherein frictional engagement is had with a wheel at the front and back thereof whereby the wheel may be effectively held against rotation in either direction.

It is also an object of my invention to employ in connection with my improved brake a wheel wherein a metallic tread is employed and wherein said tread is resiliently supported so that the wheel will substantially absorb all shocks or vibration incident to the travel of a vehicle to which the same is applied.

A still further object of my invention is to provide a brake mechanism having novel and improved means whereby the brake shoes are supported in applied position and wherein certain of said shoes may be operated independently of the remainder.

The invention consists in the details of construction and in the combination and arrangement of the several parts of my improved vehicle brake whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1:
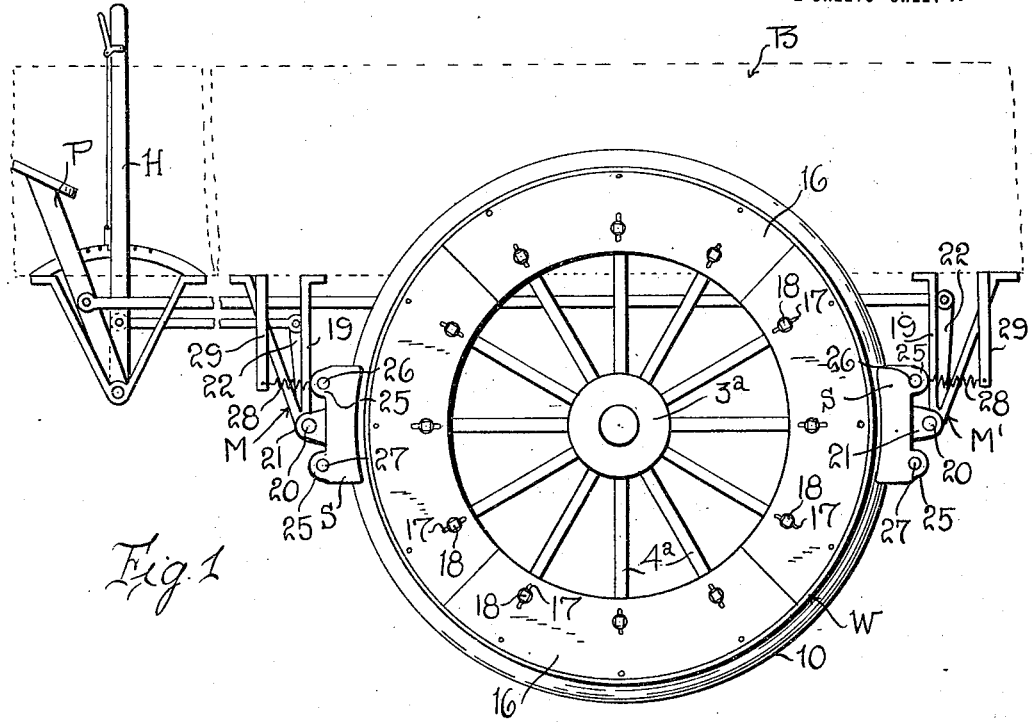
Figure 2:
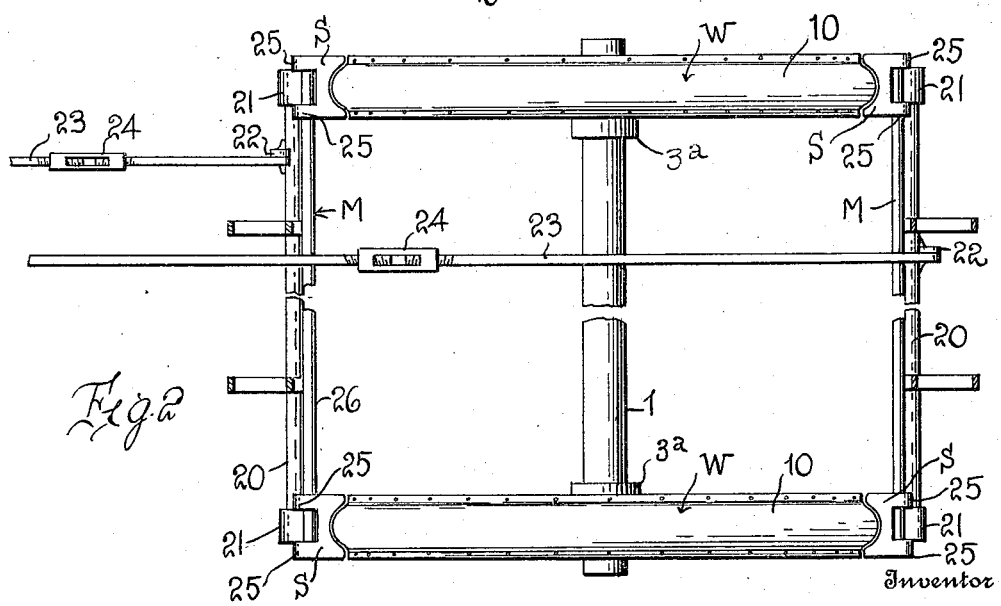

Figure 1 is a view in side elevation illustrating a brake mechanism constructed in accordance with an embodiment of my invention, the body of the vehicle being indicated by dotted lines; Fig. 2 is a view partly in section and partly in top plan illustrating the brake mechanism as herein embodied; Fig. 3 is a view in elevation of a part of my improved brake mechanism with one of the members indicated in section; Fig. 4 is a fragmentary enlarged sectional view illustrating certain details of construction of one of the wheels as herein disclosed; Fig. 5 is a transverse sectional view taken through the structure shown in Fig. 4; and Fig. 6 is a view in top plan of one of the springs employed in connection with the resilient wheel as herein set forth.

As disclosed in the accompanying drawings, 1 denotes a supporting axle with which the body B (indicated by dotted lines in Figs. 1 and 3) is adapted to be operatively engaged and rotatably mounted upon the extremities of said axle 1 are the wheels W herein disclosed as comprising a felly 2 operatively engaged with the hub 3ª through the medium of the spokes 4ª in a conventional manner. Disposed around the felly 2 and suitably secured thereto is the rim 3 and concentrically disposed relative to the rim 3 and in predetermined spaced relation thereto is a second rim 4, said rims 3 and 4 having interposed therebetween the expansible members 5 herein disclosed as coiled springs.

As herein set forth, each of the members 5 has its end convolution or fake 6 provided with the oppositely disposed extensions 7 affording an increased bearing or contacting surface for the members 5 as is believed to be particularly illustrated in Figs. 4 and 5 and the opposite end portions of the spring are longitudinally extended as at 8, said portions 8 being at substantially the axial center of the member 5 and extended through the rim 3 and felly 2 and through the outer rim 4 and the free end portions of the extensions 8 have operatively engaged therewith the clamping nuts 9 whereby it will be perceived that the member 5 is effectively maintained in applied position.

It will be understood that the members 5 are of such tension as to maintain the rims 3 and 4 separated but will compensate for the weight imposed thereon to substantially absorb all undue vibration or shock. Secured to the outer surface of the rim 4 is the annular tread member 10 having its intermediate portion substantially semicircular in cross section, as indicated at 11, and affording the annular marginal flanges 12 whereby the tread may be readily and conveniently secured to the rim 4.

The members 5 are further maintained in applied position by the clip bolts 14 disposed through the rims 3 and 4 and overlying or bridging the extension 7, as is believed to be clearly illustrated in Figs. 4 and 5, and co-acting with the clip bolts 14 in a conventional manner are the clamping bolts 15.

In order to protect the interposed members 5 I provide the rim 4 at opposite sides with the inwardly disposed shield sections 16 of sufficient width as to overlie the opposite sides of the felly 2 and said sections 16 are provided with the radial slots 17 through which extend the guide members 18 herein disclosed as headed screw members and operatively engaged with the side faces of the rim 3. It is also to be recognized that the form of the tread member 10 in cross section effectively serves to prevent skidding. Coacting with the wheels W at the front and rear thereof and substantially in radial alinement are the brake mechanisms M and M', the mechanism M being under control of the foot pedal P and the mechanism M' being under control of the hand lever H. As the construction of both of the mechanisms M and M' is substantially identical, it is thought that a description of one will suffice for both.

As herein disclosed, 19 denotes hangers depending from the body B and having mounted in their lower ends the transversely disposed rock shaft 20 having fixed to the opposite end portions thereof the lugs 21 extending rearwardly from the longitudinal centers of the shoes S whereby said shoes S rock in unison with the shaft 20 and frictionally engage the treads 10 of the wheels W and as herein embodied, the shaft 20 is provided with the upstanding rock arm 22 operatively engaged through the medium of the link 23 with either the foot pedal P or the hand lever H. It is to be observed, in the present embodiment of my invention, that the link 23 comprises two sections operatively connected by the turn buckle 24 whereby said link or rod 23 may be shortened or lengthened in order to adjust the same longitudinally to meet the necessities of practice. At the opposite end thereof the shoes S are provided with the transversely alined perforate lugs 25 and operatively engaged with the upper of said lugs is the transversely disposed bar or rod 26 which serves to assure simultaneous movement of the shoes F and to impart additional strength thereto and the rod or bar 26 is provided with the depending and outwardly inclined truss bars 27 which are operatively engaged with the lower lugs 25 as particularly illustrated in detail in Fig. 3 and for a purpose which is believed to be self-evident.

As is clearly illustrated in Fig. 1, it will be observed that the pedal P or the hand lever H will be so operated to rock the shaft 20 as to cause the upper ends of the shoes to frictionally engage the tread member 10. I also find it of advantage to employ in connection with the upper end of each of the shoes S the retractable member 28 herein disclosed as a conventional coil spring having its outer extremity anchored to the arm 29 depending from the body B whereby it will be perceived that the adjustment of the shoe into an inoperative position will be facilitated. It is also to be particularly noted in Fig. 2 that the contacting face of each of the shoes S conforms to the contour of the tread member 10 so that the requisite frictional contact may be had therewith and it will be further noted that the configuration of the tread member 10 in cross section affords an increased frictional surface.

From the foregoing description, it is thought to be obvious that a vehicle brake constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

What I claim is:

In combination with substantially transversely alined wheels, a brake mechanism coacting therewith comprising a rock shaft, a shoe associated with each of the wheels, an inwardly disposed lug carried by the shoe intermediate its length and fixed to the rock shaft, inwardly disposed lugs carried by the opposite end portions of the shoe, a bar connected with the upper lugs of the shoes and provided with depending branches engaged with the lower lugs of the shoes, a retractile member engaged with the upper end of each of the shoes for normally maintaining the upper end of the shoe away from the associated wheel, and means for imparting rotation to the rock shaft.

In testimony whereof I hereunto affix my signature in the presence of two witnesses.

ADAM H. GROSZ.

Witnesses:
HENRY R. KLARE,
P. R. GERRENS.

Copies of this patent may be obtained for five cents each, by addressing the "Commissioner of Patents, Washington, D. C."